March 29, 1932. G. W. McKEE 1,851,860
METER CONNECTION
Filed July 5, 1928
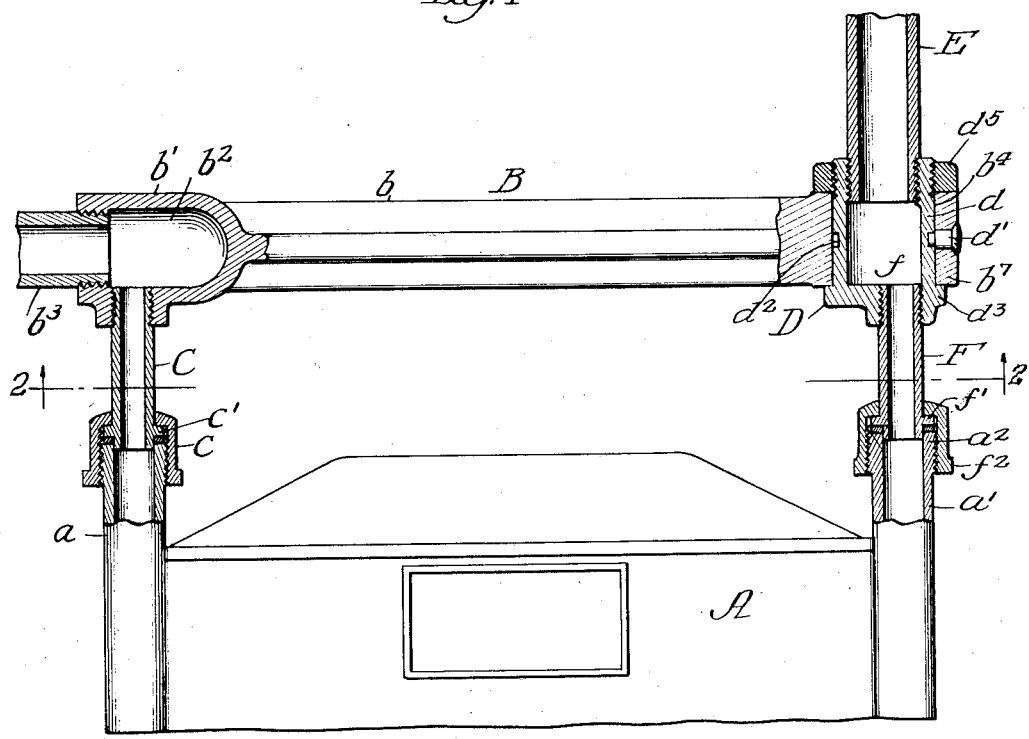
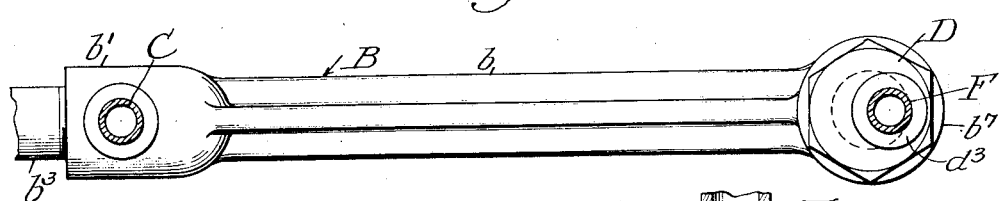
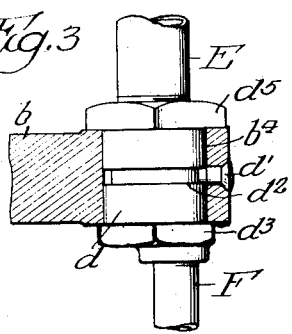
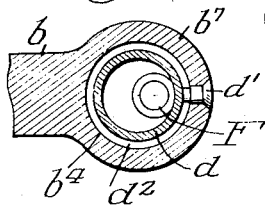
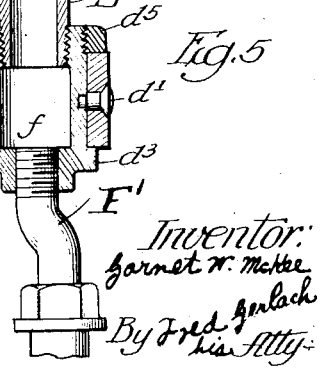

Patented Mar. 29, 1932

1,851,860

UNITED STATES PATENT OFFICE

GARNET W. McKEE, OF ROCKFORD, ILLINOIS

METER CONNECTION

Application filed July 5, 1928. Serial No. 290,376.

The present invention relates to devices for use in connecting meters to gas supply and service pipes.

The objects of the invention are to provide: an improved meter connecting device of the type wherein a rigid or non-adjustable crossbar is utilized to support coupling-nipples for the inlet and outlet tubes of the meter; an improved device of this type, in which the bar and the coupling nipples can be assembled and shipped in unit form to the user; an improved meter connecting device in which one of the coupling nipples is connected to a horizontally rotatable member or sleeve in one end of the bar, so that the fitter in installing the device can adjust the one nipple relatively to the other in order to effect the proper registration of the two nipples with respect to the inlet and outlet tubes on the meter, without screwing or unscrewing the nipples; an improved meter connecting device of the rigid bar type, which contemplates adjustment of the coupling nipples into accurate registry with the meter-tubes, and at the same time permits of the use of straight coupling nipples, which are less expensive and can be produced with greater precision than bent or offset nipples, and can be reamed to form smooth pasageways for the gas; a connecting device which is constructed to prevent theft of gas by a cross-port drilled longitudinally through the bar; and a meter connection which may be used with gas pipes of different diameters by the substitution of the rotatable sleeve in the bar. Other objects of the invention and the various advantages and characteristics of the present construction will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views: Fig. 1 is a front elevational view of a meter connecting device embodying one form of the invention, parts being shown in section for purposes of illustration. Fig. 2 is a horizontal section taken on the line 2—2 of Fig. 1. Fig. 3 is a detail view of the end of the bar that is associated with the rotatable sleeve. Fig. 4 is a section taken on the line 4—4 of Fig. 1. Fig. 5 is a detail sectional view, showing another form of the invention.

The invention is exemplified with a gas meter A which may be of any suitable construction and is provided at the sides thereof with vertical inlet and outlet tubes $a$, and $a'$. The latter are formed integrally with the casing of the meter and are provided at their upper ends with external screw-threads $a^2$ for connection to coupling-nipples. The extreme upper ends of the tubes are usually formed with ground seats in order to make fluid tight connection with the coupling-nipples.

The improved connecting device (Figs. 1, 2, 3 and 4) which forms the subject matter of the present invention comprises a rigid cross bar B which is preferably formed of a casting and embodies longitudinal ribs $b$ at the central portion thereof. A head $b'$ is formed integrally with one end of the bar and has a socket $b^2$ therein. A supply pipe $b^3$ for delivering gas to the meter A is threaded into the outer end of the socket $b^2$. A straight vertically extending coupling-nipple C has its upper end threaded into the bottom of the socket $b^2$ and is adapted to conduct gas from the supply pipe $b^3$ to the inlet tube $a$ of the meter. A coupling-ring $c$ engages a flange $c'$ on the lower end of the nipple C and is internally threaded to engage the screw thread $a^2$ on the tube $a$ so as to connect the nipple in place and form a gas-tight connection.

The end of the bar B that is opposite to the socket $b^2$ is provided with a tubular portion $b^7$. The latter has formed therein and extending therethrough a cylindrical opening $b^4$ the axis of which is vertical and extends in parallel relation with the coupling nipple C. A vertically extending sleeve D has a cylindrical peripheral portion $d$ which fits and is rotatable in the opening $b^4$. This sleeve has the upper end thereof threaded internally so that it may be connected to a service or delivery pipe E which delivers gas from the meter to the various points of consumption. The sleeve D is held in the tubular portion $b^7$ of the bar by a stud $d'$ which is fixedly held in place and extends into an annular groove $d^2$ in the outer peripheral portion $d$ of the sleeve. This stud permits the sleeve to be rotated in the opening $b^4$ and holds the sleeve and bar in connected relation. A polygonal flange or shoulder $d^3$ which is adapted to engage the bottom face of the tubular portion $b^7$ is formed on the lower end of sleeve D so the sleeve may be turned by a wrench either to connect it to the pipe E or to rotate it in the bar. To assist the stud $d'$ in retaining the sleeve D against axial displacement in the opening $b^4$ a lock-nut $d^5$ is threaded to the upper end of the sleeve. This nut, when tightened, engages the top face of the tubular portion $b^7$ and clamps the sleeve against rotation relatively to the bar. A straight vertically extending coupling-nipple or stud F, for connecting the meter-tube $a'$ to the sleeve D, has its upper end provided with an external screw-thread $f$ to engage a corresponding internal screw thread in the lower end of the sleeve. An internally screw-threaded coupling ring $f^2$ engages a flange $f'$ on the lower end of the nipple F, and is adapted for connection to the thread $a^2$ on the tube $a'$ to secure said tube and nipple together and form a tight connection therebetween.

In practice, it is necessary to provide for variation in the spacing between the coupling nipples because the inlet and outlet tubes of different meters are spaced various distances apart and it is necessary to apply or connect the nipples, without straining the tubes, as well understood in the art. For this purpose, the upper end of the nipple F is screw-threaded in a hole which is eccentrically disposed in, and with respect to, the axis of the sleeve D, so that rotation of the sleeve in the bar B will move the nipple F bodily and horizontally to or from the nipple C at the opposite end of the cross bar. By connecting the upper end of the nipple F eccentrically to the sleeve the desired spacing of the coupling rings $c$ and $f^2$ may be effected by the use of a straight nipple.

In practice, the various parts of the device including the bar B, sleeve D, nipples C and F, coupling rings $c$ and $f^2$ and nut $d^5$ are assembled at the factory and shipped to the users in unit form. In installing the device, the head $b'$ is first screwed onto the supply pipe $b^3$. The sleeve D in then rotated by a wrench applied to its polygonal flange or shoulder $d^3$ to screw it onto the service or delivery pipe E. Thereafter the sleeve D and nipple F are rotated together until the spacing between the nipples C and F will accurately correspond to the spacing between the meter-tubes $a$ and $a'$. When this has been done, it is only necessary to connect the rings $c'$ and $f^2$ to the tubes.

In Fig. 5, a second form of the invention is shown. In this form the outlet nipple F' has its upper end concentrically connected to the lower end of the sleeve, and its lower portion bent or offset relatively to the upper portion, so that by rotation of the sleeve, the lower end of the nipple may be adjusted to and from the straight inlet nipple.

The invention exemplifies a meter connecting device which comprises a rigid bar and a sleeve which is rotatably mounted in the bar and is adapted to be connected at its upper and lower ends to the service pipe and nipple respectively, so that by rotation of the sleeve, the desired spacing between the nipples may be varied according to the meter to which the connection is to be attached. The invention also exemplifies a meter-connection of the rigid-bar type in which straight coupling nipples may be used. The invention also exemplifies a connecting device which can be advantageously shipped to the user with the bar, sleeve, and nipples in connected relation, and in which it is not necessary for the user to disturb the screw-threaded connections of the nipples in adjusting the nipples to different spacings. In addition the invention exemplifies a meter connecting device which can be produced at a low cost, and can be connected to the pipes without union couplings.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A meter connecting device of the character described, comprising a rigid bar adapted to extend horizontally and having means at one end thereof for association with a gas pipe and a coupling nipple and an integral substantially vertical bearing at its other end, a sleeve fitted and confined in the bearing to rotate on a fixed substantially vertical axis provided at its upper end with a screw thread for direct connection to a second gas pipe and a longitudinally extending opening in its lower end, a coupling nipple connected to the lower end of the sleeve and in communication with the aforesaid opening, and means for holding the sleeve against axial movement in the bearing.

2. A meter connecting device of the character described, comprising a rigid one-piece bar adapted to extend horizontally and having means at one end thereof for connection to a gas pipe and a coupling nipple and an integral substantially vertical bearing at its other end, a sleeve fitted and confined in the bearing to rotate on a fixed substantially vertical axis and provided at its upper end with a screw thread for direct connection to a second gas pipe and an opening in its lower end, a coupling nipple extending upwardly into the aforesaid opening in the lower end of the sleeve and connected to said sleeve by a screw thread connection, and means for holding the sleeve against axial movement in the bearing.

3. In a meter connecting device, the combination of a rigid bar provided at one end thereof with means for connection to a pipe, a coupling-nipple connected to the means and adapted to communicate with the pipe through said means, a sleeve having a truly cylindrical periphery extending transversely through and mounted rotatably in the other end of said bar, said sleeve embodying at one of its ends a screw-thread for connection to a second pipe and being adapted to be connected to said second pipe by rotation relatively thereto, and a coupling-nipple connected to the other end of said sleeve.

4. In a meter connecting device, the combination of a rigid one-piece bar provided at one end thereof with means for connection to a pipe, a coupling-nipple attached to the means and adapted to communicate with the pipe through said means, a sleeve extending transversely through and mounted rotatably in the other end of said bar and provided at one of its ends with means for direct connection to a second pipe, a coupling-member connected to the other end of said sleeve, and means formed separately from the bar for holding the sleeve against axial displacement relatively to said bar.

5. In a meter connecting device, the combination of a rigid bar provided at one end thereof with means for connection to a pipe, a coupling-nipple attached to the means and adapted to communicate with the pipe through said means, a sleeve extending transversely through and mounted rotatably in the other end of said bar and provided at one of its ends with means for connection to a second pipe, a coupling-member connected to the other end of the sleeve, said sleeve having an annular groove in the outer periphery thereof, and a stud carried by the said other end of the bar and projecting into the groove to hold the sleeve against axial displacement relatively to the bar.

6. In a meter connecting device, the combination of a rigid bar provided at one end with means for connection to a pipe, a coupling-nipple attached to the means and adapted to communicate with the pipe through said means, a sleeve extending transversely through and mounted rotatably in the other end of said bar and provided at one of its ends with means for connection to a second pipe, said sleeve having an eccentrically disposed screw-threaded opening in its other end, and a substantially straight coupling-nipple extending into and connected to said screw-threaded opening.

7. In a meter connection, the combination of a rigid bar provided at one end thereof with an integral hollow head having a screw-thread for connection to a pipe, a coupling-nipple screw-threaded to the head and in communication with the pipe through said head, a transversely extending tubular portion formed integrally with the other end of the bar, a sleeve extending through and mounted rotatably in the tubular portion, said sleeve embodying at one of its ends a screw-thread for direct connection to a pipe and being adapted, while in the tubular portion to be connected to said second pipe by rotation relatively thereto, a coupling-nipple threaded to the other end of said sleeve, and means formed separately from the tubular portion for holding the sleeve against axial displacement in said tubular portion.

8. In a meter connecting device, the combination of a rigid bar provided at one end thereof with means for connection to a pipe, a coupling nipple attached to the means and adapted to communicate with the pipe through said means, a sleeve extending transversely through and mounted rotatably in the other end of said bar and provided at the ends thereof with means for connection to a second pipe and another coupling nipple, and a nut mounted on one end of the sleeve and engaging the bar for retaining said sleeve against displacement in the bar.

9. A meter connecting device of the character described, comprising a rigid bar adapted to extend horizontally and having means at one end thereof for connection to a gas pipe and to a coupling nipple and an integral substantially vertical bearing at its other end, a sleeve fitted and confined in the bearing to rotate on a fixed substantially vertical axis and provided at its ends with longitudinally extending internal screw threads for connection to a second gas pipe and a second coupling nipple, and a nut mounted on one end of the sleeve and engaging the bearing for retaining the sleeve against displacement in said bearing.

10. In a meter connecting device, the combination of a rigid bar provided at one end thereof with means for connection to a pipe and having a bearing extending through its other end, a coupling nipple attached to the means and adapted to communicate with the pipe through said means, and an open-ended sleeve fitted in the bearing to rotate on a fixed axis and provided at its ends with longitudinal screw threads for connection to a second pipe and another coupling nipple, said sleeve also being provided at one of its ends with an outwardly extending polygonal flange adapted to be turned in order to effect connection of the sleeve and said second pipe.

11. In a meter connecting device, the combination of a rigid bar provided at one end thereof with means for connection to a pipe, a coupling nipple attached to the means and adapted to communicate with the pipe through said means, and a sleeve extending transversely through, and mounted to rotate on a fixed axis in the other end of the bar and provided at its ends with longitudinal screw threads for connection to a second pipe and another coupling nipple, said sleeve being also provided at one end thereof with a polygonal flange and at its other end with a nut whereby it is retained in place against displacement relatively to the bar.

12. Means for spacing the service pipes of meters comprising a rigid one-piece bar having at one end thereof means for engaging a conduit element and having at the other end a substantially cylindrical opening, a substantially cylindrical sleeve rotatably mounted in said opening, said sleeve having a stop shoulder engaging said bar, and provided at its ends with screw threads for direct connection to a service pipe and to a coupling nipple, and means to prevent axial movement of said sleeve in said opening.

Signed at Chicago, Illinois, this 27th day of June, 1928.

GARNET W. McKEE.